(12) United States Patent
Waldman et al.

(10) Patent No.: US 11,340,343 B2
(45) Date of Patent: May 24, 2022

(54) APPARATUS AND METHODS FOR THICKNESS AND VELOCITY MEASUREMENT OF FLAT MOVING MATERIALS USING HIGH FREQUENCY RADAR TECHNOLOGIES

(71) Applicants: Dolphin Measurement System, LLC, Providence, RI (US); Ellis S. Waldman, Providence, RI (US); Alexander M. Raykhman, Providence, RI (US); Boris Sherman, Providence, RI (US)

(72) Inventors: Ellis S. Waldman, Providence, RI (US); Alexander M. Raykhman, Providence, RI (US); Boris Sherman, Providence, RI (US)

(73) Assignee: DOLPHIN MEASUREMENT SYSTEMS, LLC, Providence, RI (US)

( * ) Notice: Subject to any disclaimer, the term of this patent is extended or adjusted under 35 U.S.C. 154(b) by 107 days.

(21) Appl. No.: 16/496,788

(22) PCT Filed: Mar. 23, 2018

(86) PCT No.: PCT/US2018/024192
§ 371 (c)(1),
(2) Date: Sep. 23, 2019

(87) PCT Pub. No.: WO2018/175995
PCT Pub. Date: Sep. 27, 2018

(65) Prior Publication Data
US 2020/0292689 A1    Sep. 17, 2020

Related U.S. Application Data

(60) Provisional application No. 62/475,712, filed on Mar. 23, 2017.

(51) Int. Cl.
*G01S 13/58* (2006.01)
*G01B 15/02* (2006.01)

(52) U.S. Cl.
CPC ............ *G01S 13/581* (2013.01); *G01B 15/02* (2013.01)

(58) Field of Classification Search
CPC ............................. G01S 13/581; G01B 15/02
(Continued)

(56) References Cited

U.S. PATENT DOCUMENTS 3,445,847 A * 5/1969 Miles ................. G01S 1/02
342/465
4,800,757 A * 1/1989 Hashinoki ............ G01B 17/02
73/597

(Continued)

FOREIGN PATENT DOCUMENTS

EP    1783517 A1 *  5/2007 ............... G01V 3/15
EP    1813912 A1 *  8/2007 ............. G01S 13/88
(Continued)

OTHER PUBLICATIONS

International Search Report and Written Opinion issued in PCT/US2018/024192, dated Jun. 20, 2019.

*Primary Examiner* — Bernarr E Gregory
*Assistant Examiner* — Nuzhat Pervin
(74) *Attorney, Agent, or Firm* — Burns & Levinson LLP; Jerry Cohen

(57) ABSTRACT

An apparatus and associated methods for measuring thickness and velocity of flat moving materials utilizing high frequency radar technologies. Two identical radar-based systems for measuring absolute distances between the source of the radar-generated electromagnetic wave and each surface of a flat sheet material is used to determine the thickness of that material as a relative distance. A pair of (Continued)

high frequency radars situated at different locations used to measure the delay time between the occurrences of fingerprint-like unevenness on the moving flat sheet of material to determine the linear velocity of the moving material sheet.

23 Claims, 4 Drawing Sheets

(58) Field of Classification Search
USPC .......................................................... 342/104
See application file for complete search history.

(56) References Cited

U.S. PATENT DOCUMENTS

| | | | | |
|---|---|---|---|---|
| 5,912,822 | A * | 6/1999 | Davis | G01S 13/581 |
| | | | | 702/143 |
| 5,949,796 | A * | 9/1999 | Kumar | H04H 20/33 |
| | | | | 370/529 |
| 6,111,543 | A * | 8/2000 | Le Herisse | G01S 1/024 |
| | | | | 342/404 |
| 6,492,933 | B1 * | 12/2002 | McEwan | G01S 13/582 |
| | | | | 342/118 |
| 7,023,376 | B1 * | 4/2006 | Kuroda | G01S 13/347 |
| | | | | 342/70 |
| 9,229,102 | B1 * | 1/2016 | Wright | G01S 13/887 |
| 9,229,162 | B1 * | 1/2016 | Roper | C23C 16/06 |
| 9,316,726 | B2 * | 4/2016 | Leskosek | G01S 13/04 |
| 2004/0246177 | A1 * | 12/2004 | Lloyd | G01S 13/583 |
| | | | | 342/453 |
| 2006/0022866 | A1 * | 2/2006 | Walton | H01Q 9/0407 |
| | | | | 342/194 |
| 2006/0232783 | A1 * | 10/2006 | Choma | G01B 9/02078 |
| | | | | 356/479 |
| 2007/0109177 | A1 * | 5/2007 | Baath | G01S 13/88 |
| | | | | 342/124 |
| 2007/0188169 | A1 * | 8/2007 | Mahler | G01B 7/10 |
| | | | | 324/229 |
| 2008/0258382 | A1 * | 10/2008 | deJong | G03G 15/6564 |
| | | | | 271/265.02 |
| 2010/0296107 | A1 * | 11/2010 | Keranen | G01B 11/0691 |
| | | | | 356/623 |
| 2011/0187586 | A1 * | 8/2011 | Corn | G01S 13/343 |
| | | | | 342/196 |
| 2011/0206830 | A1 * | 8/2011 | Kumar | G01B 11/065 |
| | | | | 427/10 |
| 2012/0092205 | A1 * | 4/2012 | Bourdelais | G01S 7/282 |
| | | | | 342/21 |
| 2015/0301167 | A1 * | 10/2015 | Sentelle | G01S 13/888 |
| | | | | 342/22 |
| 2017/0254692 | A1 * | 9/2017 | Faber | G01F 23/284 |
| 2017/0276778 | A1 * | 9/2017 | Gozni | G01S 13/08 |

FOREIGN PATENT DOCUMENTS

| | | | | |
|---|---|---|---|---|
| EP | 2682722 A1 * | 1/2014 | | G01H 9/00 |
| WO | 2016110849 A1 | 7/2016 | | |
| WO | WO-2016110849 A1 * | 7/2016 | | G01S 13/08 |
| WO | 2017025910 A1 | 2/2017 | | |
| WO | WO-2017025910 A1 * | 2/2017 | | B21B 38/04 |

* cited by examiner

APPARATUS AND METHODS FOR THICKNESS AND VELOCITY MEASUREMENT OF FLAT MOVING MATERIALS USING HIGH FREQUENCY RADAR TECHNOLOGIES

CROSS-REFERENCE TO RELATED APPLICATIONS

This application is a U.S. national stage application under 35 U.S.C. 371 of co-pending International Application No. PCT/US2018/024192, filed Mar. 23, 2018 and entitled APPARATUS AND METHODS FOR THICKNESS AND VELOCITY MEASUREMENT OF FLAT MOVING MATERIALS USING HIGH FREQUENCY RADAR THCHNOLOGIES, which in turn claims priority to and benefit of U.S. Provisional Application No. 62/475,712, filed Mar. 23, 2017, which are incorporated by reference herein in their entirety for all purposes.

FIELD OF THE INVENTION

The invention relates generally to the field of continuous measurement of thickness of immobile or moving flat sheet materials and their velocity, and particularly to manufacturing processes such as cold rolling manufacturing.

BACKGROUND OF THE INVENTION

Radar technology options have been available for velocity and absolute distance measurement. The foundation of absolute distance measurement using radar technology is frequency modulated continuous wave (FMCW) measurement. Conventional FMCW technique can only measure the absolute distance with a spatial resolution that is inversely proportional to the total swept bandwidth of the signal generator. On the other hand, microwave interferometry technology showed that a single frequency source can be used to perform relative distance measurement with high spatial resolution by phase measurement through the interference pattern. However, the measurement dynamic range is limited to half of the wavelength in the media.

Lidar (Light Detection and Ranging) technology has also been implemented for industrial application. However, a harsh environment in the proposed applications can make optical components unsuitable to use. Inductive sensors have also been implemented for the related applications. However, the short working distance and the high thermal sensitivity noticeably limit their applicability.

SUMMARY OF THE INVENTION

Measuring thickness can be viewed as the relative distance measurement. The high accuracy thickness measurement applications like the thickness of metal sheets in a cold rolling manufacturing process or the thickness of paper sheets produced in the pulp and paper industry manufacturing plants would require an involvement of multiple radar installations with specific requirements to signal processing for generating real-time coarse and fine thickness measurements.

Because of harsh environments and very high requirements to the quality of the measured flat materials' surfaces, a non-invasive approach to the above measurements becomes an imperative requirement for the development of those types of measuring apparatuses and methods.

In addition, due to the fact that measurement applications can be characterized by a fast linear movement of flat sheets of material, the simultaneous measurement of the flat material thickness and velocity would be beneficial to those processes, thereby justifying the utility of simultaneous high accuracy measurement of the thickness and linear velocity of flat sheets of materials during their manufacturing processes; both for the purpose of automatic control and throughput fiscal measurements.

The current disclosure relates, at least in part, to the apparatus and methods for the thickness measurement using a pair of high frequency radars. Two high frequency radars positioned on both sides of flat moving material are employed to precisely measure the distance from the radar transmitter and the surface of both top and bottom sides of the flat moving materials. Given fixed positions for the first and second radars on both sides, the thickness of flat moving materials can be calculated directly in real-time.

A third radar on the top/bottom side of the flat moving material is positioned at a fixed distance away from the first/second radar horizontally. The third radar is positioned at the same vertical height as that of the first/second radar on top/bottom side of the flat moving material. The surface roughness, i.e., the distance change as a function of time, is measured by both radars on top/bottom side. Given the fixed distance between two radars on the same side, the time delay between the two measurements is inversely proportional to the moving velocity of the flat moving material.

One embodiment of the present invention provides a method for measuring thickness of a material having opposing sides, comprising the steps of: performing distance measurement to the opposing sides of the material using two radar transceivers having a fixed distance between each other and mounted to be located on opposing sides of the material for thickness measurement, wherein the step of performing distance measurement from each transceiver includes determining a coarse measurement with a swept millimeter wavelength pulse and refining the coarse measurement by phase comparison between a transmitted radar pulse and a corresponding received radar pulse; and subtracting the distance measurements to the opposing sides of the material from their respective transceiver from the fixed distance between the two radar transceivers.

The material may be an elongated flat material of plate, sheet or foil form. The method may further comprise continuously measuring the thickness of the material while the material is moving. The material may be electrically conductive. The material may be metal in a hot or cold rolling process.

Each of the two radar transceivers may have an antenna aimed at the same measurement location on opposing sides of the material being measured. Each antenna may be aimed orthogonally at a surface of the material being measured. The fixed distance may be determined between the antennas of the two respective radar transceivers.

The method may further comprise the step of measuring velocity of the material by locating a third radar transceiver at a second fixed distance from one transceiver of the two radar transceivers and aligned to transmit and receive radar pulses to and from a same portion of the material as the one transceiver during movement of the material, and cross-correlating radar pulses received by the third radar transceiver and the one transceiver to determine time delay and velocity of material movement. The third radar transceiver may be located at approximately the same distance from the material as the one transceiver.

The flat material may be paper, plastic, glass, metal, ceramic, composite, laminate, coated or fiber reinforced material in sheet, strip or film.

The step of determining a coarse measurement may includes the steps of: demodulating received pulses to an intermediate frequency (IF) pulse signal; performing a Fast Fourier Transform (FFT) on data for each IF pulse signal to determine intensity and phase information; determining a maximum intensity and frequency thereof from the FFT intensity information; determining a maximum phase from the phase information corresponding to the maximum intensity; determining intensity and phase demodulators using the frequency of the maximum intensity and the maximum phase; providing separate intensity and phase demodulated signals by demodulating the corresponding IF pulse signal separately with the determined intensity and phase demodulators; low-pass filtering the separate demodulated intensity and phase demodulated signals to determine respective intensity and phase values; and calculating a quadrature phase value from the respective intensity and phase values; and using the calculated quadrature phase value to determine a coarse measurement.

The step of refining the coarse measurement may use the FFT phase information.

Another embodiment of the present invention provides a method of measuring velocity of moving material, comprising the steps of: locating first and second radar transceivers to transmit and receive radar pulses off a same portion of moving flat material at a fixed distance in the direction of flat material movement and cross-correlating received radar pulses by the first and second transceivers to determine time delay and velocity of material movement. The first and second radar transceivers may be located at approximately the same distance from the moving material.

Yet another embodiment of the present invention provides an apparatus for measuring thickness of a material, comprising: a pair of radar transceivers mounted at a fixed distance from each other and each adapted to transmit and receive swept radar pulses to and from opposing material surfaces located between the two transceivers, wherein each transceiver includes means for demodulating and storing received radar pulses; processing means for each transceiver adapted to determine a coarse measurement of distance between the respective transceiver and material surface and adapted for refining the determined coarse measurement of distance; and processing means adapted to subtract both refined coarse measurements from the fixed distance to determine thickness of the material.

The material may be an elongated flat material of plate, sheet or foil form. The pair of radar transceivers and their respective processing means may be adapted for continuously measuring the thickness of the material while the material is moving. The apparatus may be adapted for thickness measurement in a hot or cold metal rolling process. Each transceiver may have an antenna aimed orthogonally at the same measuring point on opposing sides of the material.

The apparatus may further comprise: a third radar transceiver mounted at a second fixed distance from one transceiver of the pair of radar transceivers and aligned to transmit and receive radar pulses to and from a same portion of the material as the one transceiver during movement of the material; and processing means adapted to cross-correlate radar pulses received by the third radar transceiver and the one transceiver to determine time delay and velocity of the moving material.

Still another embodiment of the present invention provides as apparatus for measuring velocity of moving material, comprising first and second radar transceivers located to transmit and receive radar pulses off a same portion of moving material at a fixed distance from each other in the direction of material movement and processing means for cross-correlating received radar pulses by the first and second transceivers to determine time delay and velocity of material movement. The first and second radar transceivers may be located at approximately the same distance from the moving material.

One embodiment of the present invention provides a method for measuring thickness of a material having opposing sides, comprising the steps of: performing distance measurement to the opposing sides of the material using two radar transceivers having a fixed distance between each other and mounted to be located on opposing sides of the material for thickness measurement, wherein the step of performing distance measurement from each transceiver includes determining a coarse measurement with a swept millimeter wavelength pulse and refining the coarse measurement by phase comparison between a transmitted radar pulse and a corresponding received radar pulse; and subtracting the distance measurements to the opposing sides of the material from their respective transceiver from the fixed distance between the two radar transceivers.

The material may be an elongated flat material of plate, sheet or foil form. The method may further comprise continuously measuring the thickness of the material while the material is moving. The material may be electrically conductive. The material may be metal in a hot or cold rolling process.

Each of the two radar transceivers may have an antenna aimed at the same measurement location on opposing sides of the material being measured. Each antenna may be aimed orthogonally at a surface of the material being measured. The fixed distance may be determined between the antennas of the two respective radar transceivers.

The method may further comprise the step of measuring velocity of the material by locating a third radar transceiver at a second fixed distance from one transceiver of the two radar transceivers and aligned to transmit and receive radar pulses to and from a same portion of the material as the one transceiver during movement of the material, and cross-correlating radar pulses received by the third radar transceiver and the one transceiver to determine time delay and velocity of material movement. The third radar transceiver may be located at approximately the same distance from the material as the one transceiver.

The flat material may be paper, plastic, glass, metal, ceramic, composite, laminate, coated or fiber reinforced material in sheet, strip or film.

The step of determining a coarse measurement may includes the steps of: demodulating received pulses to an intermediate frequency (IF) pulse signal; performing a Fast Fourier Transform (FFT) on data for each IF pulse signal to determine intensity and phase information; determining a maximum intensity and frequency thereof from the FFT intensity information; determining a maximum phase from the phase information corresponding to the maximum intensity; determining intensity and phase demodulators using the frequency of the maximum intensity and the maximum phase; providing separate intensity and phase demodulated signals by demodulating the corresponding IF pulse signal separately with the determined intensity and phase demodulators; low-pass filtering the separate demodulated intensity and phase demodulated signals to determine respective intensity and phase values; and calculating a quadrature phase value from the respective intensity and phase values; and using the calculated quadrature phase value to determine a coarse measurement.

The step of refining the coarse measurement may use the FFT phase information.

Another embodiment of the present invention provides a method of measuring velocity of moving material, comprising the steps of: locating first and second radar transceivers to transmit and receive radar pulses off a same portion of moving flat material at a fixed distance in the direction of flat material movement and cross-correlating received radar pulses by the first and second transceivers to determine time delay and velocity of material movement. The first and second radar transceivers may be located at approximately the same distance from the moving material.

Yet another embodiment of the present invention provides an apparatus for measuring thickness of a material, comprising: a pair of radar transceivers mounted at a fixed distance from each other and each adapted to transmit and receive swept radar pulses to and from opposing material surfaces located between the two transceivers, wherein each transceiver includes means for demodulating and storing received radar pulses; processing means for each transceiver adapted to determine a coarse measurement of distance between the respective transceiver and material surface and adapted for refining the determined coarse measurement of distance; and processing means adapted to subtract both refined coarse measurements from the fixed distance to determine thickness of the material.

The material may be an elongated flat material of plate, sheet or foil form. The pair of radar transceivers and their respective processing means may be adapted for continuously measuring the thickness of the material while the material is moving. The apparatus may be adapted for thickness measurement in a hot or cold metal rolling process. Each transceiver may have an antenna aimed orthogonally at the same measuring point on opposing sides of the material.

The apparatus may further comprise: a third radar transceiver mounted at a second fixed distance from one transceiver of the pair of radar transceivers and aligned to transmit and receive radar pulses to and from a same portion of the material as the one transceiver during movement of the material; and processing means adapted to cross-correlate radar pulses received by the third radar transceiver and the one transceiver to determine time delay and velocity of the moving material.

Still another embodiment of the present invention provides as apparatus for measuring velocity of moving material, comprising first and second radar transceivers located to transmit and receive radar pulses off a same portion of moving material at a fixed distance from each other in the direction of material movement and processing means for cross-correlating received radar pulses by the first and second transceivers to determine time delay and velocity of material movement. The first and second radar transceivers may be located at approximately the same distance from the moving material.

BRIEF DESCRIPTION OF THE DRAWINGS

The following brief description, given by way of example, but not intended to limit the disclosure solely to the specific embodiments described, may best be understood in conjunction with the accompanying drawings, in which.

DETAILED DESCRIPTION OF THE DRAWINGS

Figure 1:
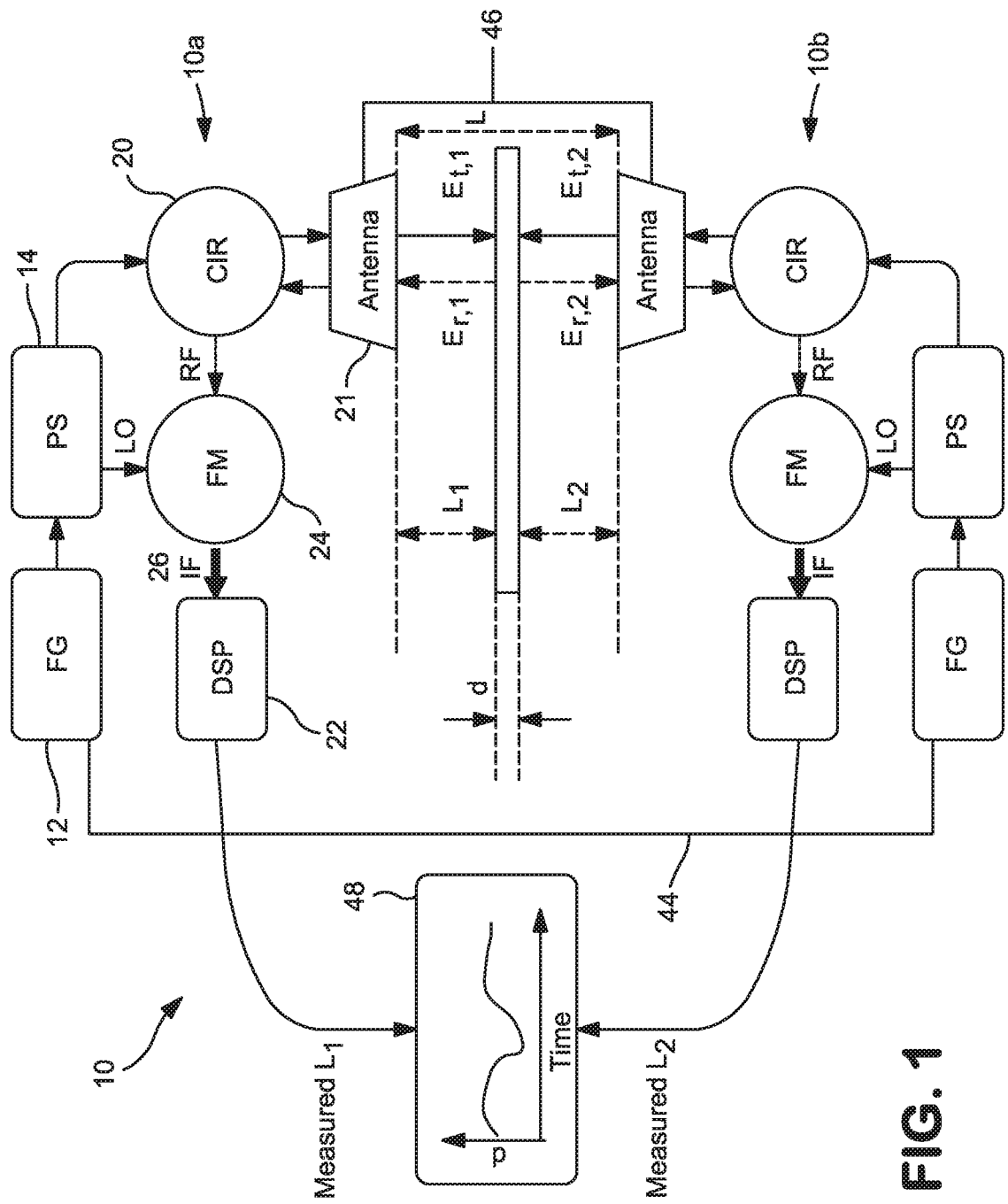
FIG. 1 shows a schematic of an embodiment of the present invention for thickness measurement of metallic or non-metallic sheet material.

FIG. 1 depicts the schematic of the radar system 10 used for thickness measurement of conductive and non-conductive material sheet in the process of its manufacturing, including two identical systems 10a and 10b. Wherein, FG denotes function generator 12; PS denotes power splitter 14, LO denotes a local oscillator signal; RF denotes a radio frequency signal; CIR denotes circulator 20; DSP denotes digital signal processing unit 22; FM denotes frequency mixer 24; IF denotes an intermediate frequency signal 26; Et,1 and Et,2 denote the transmitted E field from the top and bottom radar, respectively; Er,1 and Er,2 denote the reflected E field from the top and bottom surface of the flat material, respectively; L denotes the distance between two antennas; L1 denotes the distance from top antenna to the top surface of the flat material; L2 denotes the distance from bottom antenna to the bottom surface of the flat material; d denotes the thickness of the flat material.

Figure 2:
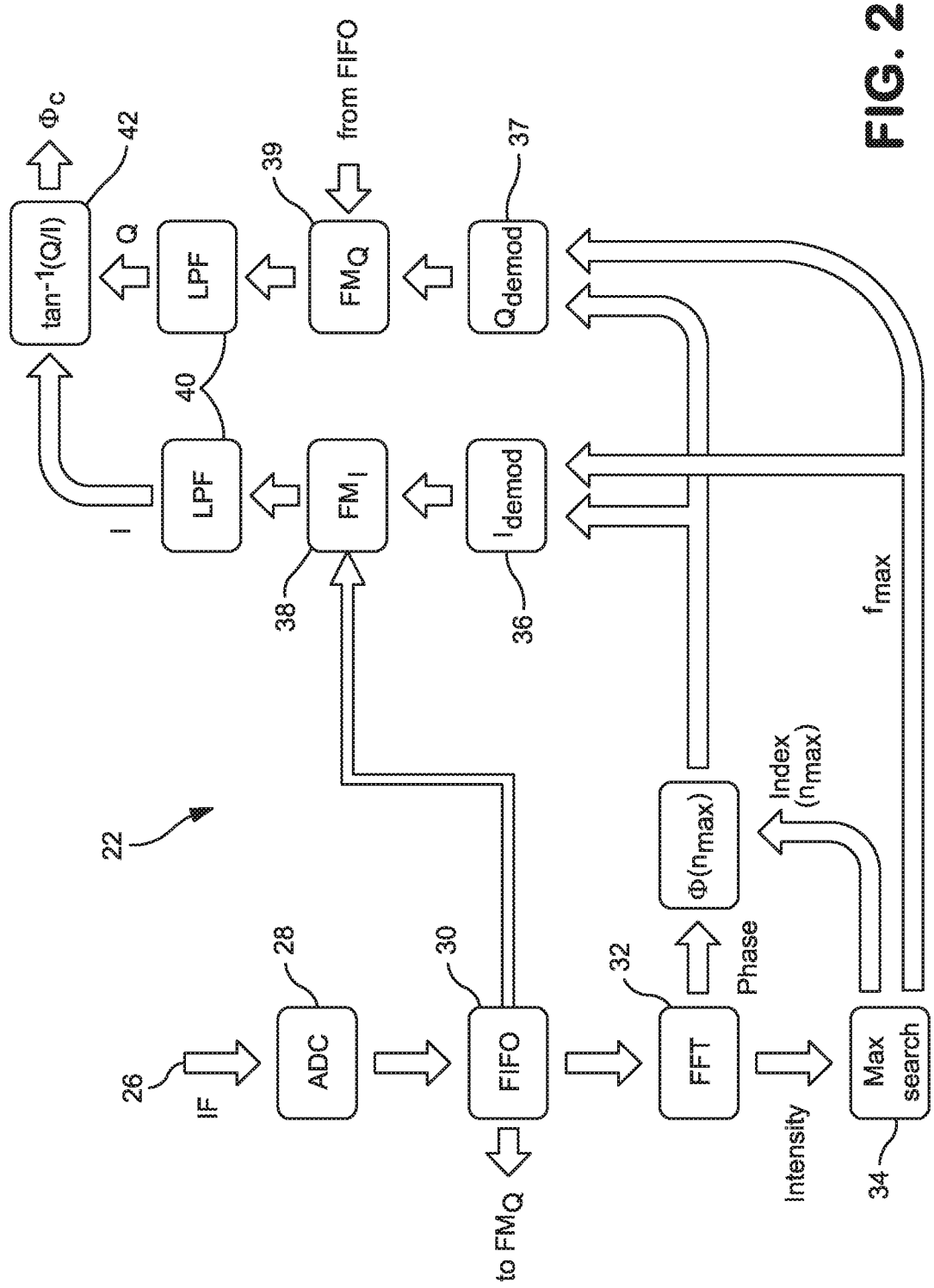
FIG. 2 illustrates the schematic of a digital signal processing module for use in conjunction with the embodiment of FIG. 1.

FIG. 2 depicts the signal flow of digital signal processing unit 22 for course measurement. Wherein, IF denotes intermediate frequency signal 26; ADC denotes analog-to-digital converter 28; FIFO denotes first-in-first-out memory 30; FFT denotes fast Fourier transform 32; $n_{max}$ denotes the index value measured from the max search function; FMI 38 and FMQ 39 denote the frequency mixer for in-phase and quadrature components, respectively; $\phi(n_{max})$ denotes the phase value of the maximum magnitude in the processed data; $f_{max}$ denotes the frequency corresponding to the maximum magnitude; LPF denotes low pass filter 40; $I_{demod}$ 36 and $Q_{demod}$ 37 denote in-phase and quadrature demodulators, respectively; I and Q denote in-phase and quadrature components; Øc is the phase of the decomposed IQ signal.

Figure 3A:
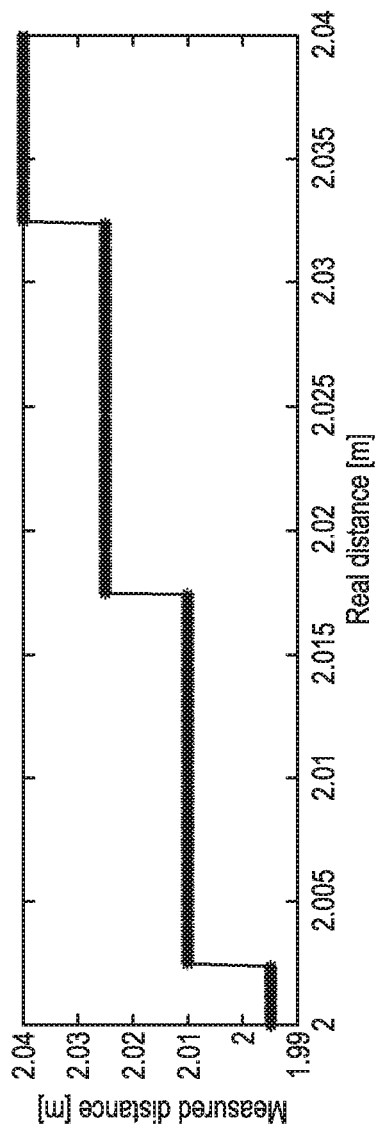
FIGS. 3A, B, C show plots of simulation results demonstrating the processing algorithm used in the embodiment of FIGS. 1 and 2.

FIG. 3A shows the measured distance as a function of real distance, calculated solely based on $f_{max}$. The distance measurement resolution is only 1.5 mm due to the limited total bandwidth (B).

Figure 3B:
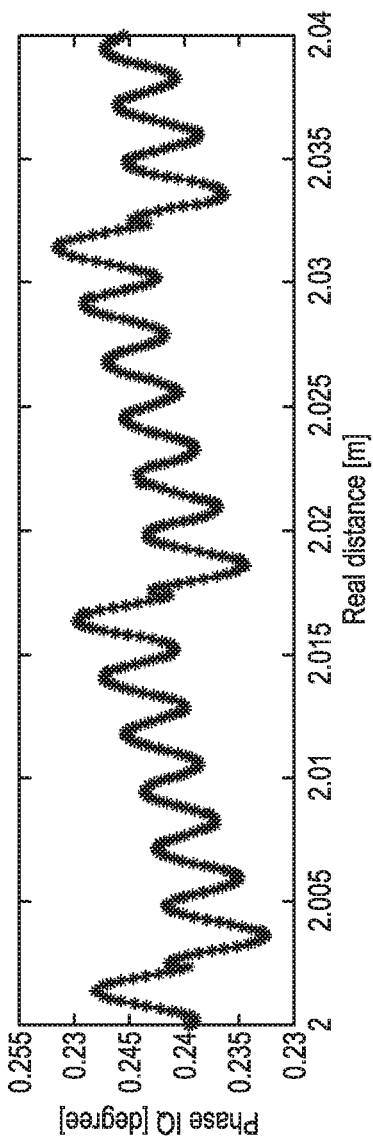

FIG. 3B shows the quadrature phase ($Ø_{IQ}$) as a function of real distance. A continuous and sinusoidal wave is superimposed on a linearly increased function within a large distance step (1.5 mm). The value of $Ø_{IQ}$ can be used to narrow down the range resolution.

Figure 3C:
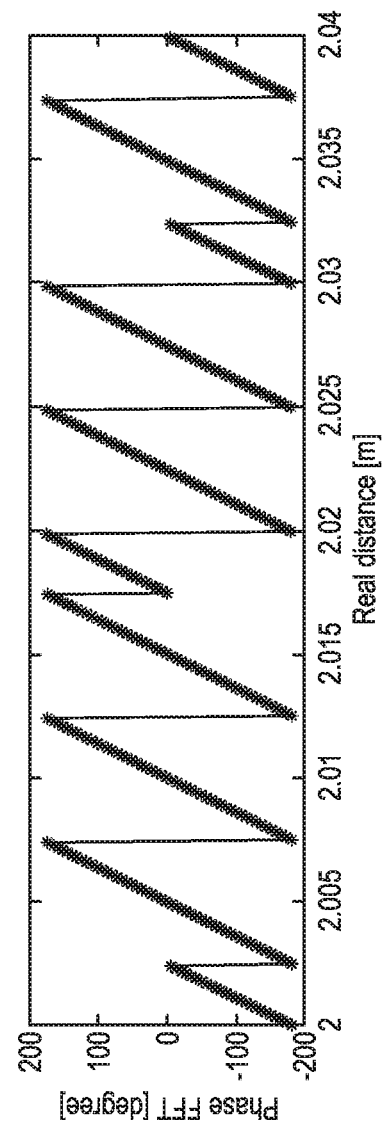

FIG. 3C shows the FFT phase value as a function of real distance. Once the narrowed range is determined, the fine measurement will be carried out based on the FFT phase function. It provides a µm level sensing resolution.

The schematic of one embodiment is shown in FIG. 1. On the top half of FIG. 1, a function generator (FG) 12 sends linearly chirped or swept high frequency microwave pulse from over a constant bandwidth (B) with a pulse duration of (T). The starting frequency is $f_{min}$ and the stop frequency is $f_{max}$. The frequency sweep speed is S=B/T. The majority of the power is delivered through a power splitter (PS) 14 followed by a circulator (CIR), and then transmitted towards the upper surface of the sheet via a horn antenna 21.

The reflected signal corresponding to the upper surface of the sheet is collected by the same antenna 21 and directed to one port of the frequency mixer (FM) 24. The signal going into this port is known as radio frequency (RF) signal, which can be expressed as:

$$v_{RF} = a_{rf}\cos(\emptyset(t-\tau_1))$$

$$\tau_1 = \frac{2L1}{c}$$

where $V_{RF}$ is the RF signal, $A_{RF}$ is the magnitude of $V_{RF}$, t is time, $\tau_1$ is the time delay of the round trip from the upper surface of the sheet to the antenna 21, c is the speed of light in air, and $L_1$ is the distance between the antenna and the upper surface of the sheet. Local oscillator (LO) signal is generated from tapping a small portion of the total high frequency power injection into the second port of the FM 24 from the PS 14. The LO signal can be represented as:

$$v_{LO} = a_{lo}\cos(\emptyset(t))$$

where $V_{LO}$ is the LO signal, and $A_{LO}$ is the magnitude of $V_{LO}$.

The mixed signal is then low pass filtered to form the intermediate frequency (IF) 26, which is delivered to a digital signal processing (DSP) module shown in FIG. 2. The IF signal can be expressed as:

$$v_{IF} = a_{if}\cos(\emptyset(t) - \emptyset(t-\tau_1))$$

where $V_{IF}$ is the IF signal, and $A_{IF}$ is the magnitude of $V_{LO}$.

The DSP 22 receives the IF signal 26 for processing and outputs the precise distance ($L_1$) between the antenna 21 and the upper surface of the sheet. IF signal 26 is collected and digitized by an analog-to-digital converter (ADC) 28, which is triggered and synchronized by the chirped pulse generator FG 12. A first-in-first-out (FIFO) memory 30 is designed to store and stack the digitized IF signal 26 over one pulse duration.

The stored samples in the FIFO 30 after one captured pulse are fed into a Fast Fourier Transform (FFT) module 32. Both intensity and phase in corresponding to the current sampled data set can be generated and stored separately. A maximum search function 34 is performed on the intensity array. The index corresponding to the maximum intensity ($n_{max}$) is found and used to find the corresponding phase value ($\emptyset(n_{max})$). The corresponding $f_{max}$ is stored for later usage.

The phase value ($\emptyset(n_{max})$) and frequency ($f_{max}$) are then used to construct the demodulators 36, 37 using following equations.

$$I_{demod} = \cos(2\pi f_{max}t + \emptyset(t) - \emptyset(t-\tau_1))$$

$$Q_{demod} = \sin(2\pi f_{max}t + \emptyset(t) - \emptyset(t-\tau_1))$$

Both I and Q demodulators 36, 37 are mixed with the raw data stored in the FIFO 30 via two frequency $FM_I$, $FM_Q$ modulators 38, 39, respectively. The final I and Q value is calculated by applied high order low pass filters (LPF) 40 on the mixed signals. The quadrature phase is then determined using the following equation 42.

$$\emptyset_{IQ} = \operatorname{atan}\left(\frac{Q}{I}\right)$$

A computer simulation is programmed to demonstrate the operational mechanism of this invention and plotted in FIG. 3. A metallic sheet is positioned 2 meters away from the antenna as the initial state. The distance L1 is then increased and swept over 40 mm.

Key parameters are listed below:

$f_{min}$: 75 GHz
$f_{min}$: 85 GHz
B: 100 GHz
S: 100 GHz/ms
L1: 2 meters (initial state)
$L_{step}$: 100 μm
N: 400 (number of steps)

The bottom half of the FIG. 1 shows the schematic the second radar ranging system 10b in the pair. It is identical to the first radar system 10a. Importantly, the two radar systems are synchronized during operation via an accessible synchronization circuit 44. Each of the chirped or swept pulses is formed and sent out to activate both systems at the same time point. The second radar system 10b measures the distance (L2) from the bottom antenna to the bottom surface of the sheet.

Both antennas are fixed on a highly stable mechanical structure 46, in other words, the relative movement between two antennas is negligible. The absolute distance between two antennas is L. Thus, the thickness of the moving sheet calculated at 48 as a function of time in between two antennas is:

$$d(t) = L - L_1(t) - L_2(t)$$

The present invention may be thereby used to measure the thickness of any suitable flat material, such as paper, plastic, glass, metal, ceramic, composite, laminate, coated or fiber reinforced material in sheet, strip or film.

Figure 4:
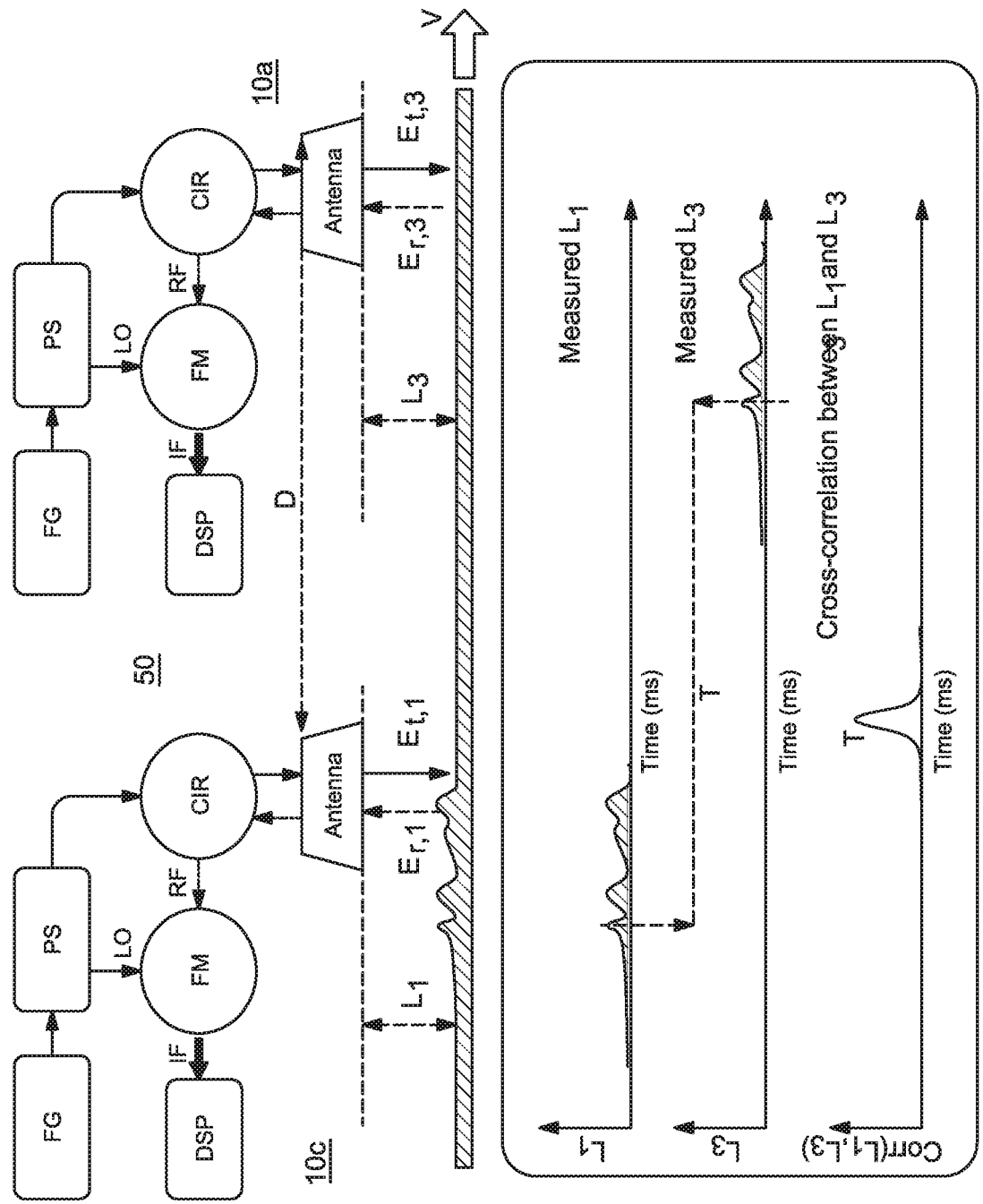
FIG. 4 depicts the schematic of the radar system used to measure the linear velocity of moving material in a manufacturing process in accordance with another embodiment of the invention.

FIG. 4 depicts the schematic of the radar system 50 used to measure the linear velocity of a flat moving material in the process of its manufacturing. Wherein, FG denotes function generator; PS denotes power splitter, LO denotes local oscillator; RF denotes radio frequency; CIR denotes circulator; DSP denotes digital signal processing unit; FM denotes frequency mixer; IF denotes intermediate frequency; Et,1 and Et,3 denote the transmitted E field from the first and third radars, respectively; Er,1 and Er,3 denote the reflected E field from surface area underneath the first and third radars, respectively; D denotes the horizontal distance between two antennas; L1 denotes the distance from the first antenna to the top surface of the flat material; L3 denotes the distance from the third antenna to the top surface of the flat material; V denotes the linear velocity of the moving material; Corr(L1,L3) denotes the cross-correlation function between the measurement results from the first and third radar.

A third identical antenna system 10c is placed away from the first antenna system 10a by distance (D). The third antenna is positioned with the same horizontal level as the first antenna. It functions the same as the other antenna systems. The measured $L_3$ as a function of time can be measured precisely with abovementioned method.

The random surface unevenness results a fingerprint-like signature in both $L_1(t)$ and $L_2(t)$. The cross-correlation between $L_1(t)$ and $L_2(t)$ is performed in real-time to find the time delay of the identical signature over distance (D).

$$T_{delay} = \text{Max search } (\operatorname{corr}(L_1(t), L_3(t)))$$

Thus, the instantaneous velocity can be determined accordingly using the following equations:

$$V = \frac{D}{T_{delay}}$$

LIST OF REFERENCE ABBREVIATIONS

The present disclosure is described in reference to the following abbreviations and symbols:
FG: frequency generator
PS: power splitter
CIR: circulator
FM: frequency mixer
DSP: digital signal processing
LO: local oscillator
RF: radio frequency
IF: intermediate frequency
L1: Distance from top antenna to the upper surface of the sheet
L2: Distance from bottom antenna to the lower surface of the sheet
L: fixed distance between top and bottom antenna
d: thickness of the sheet
Et,1: transmitted microwave from top antenna
Er,1: reflected microwave from the upper surface of the sheet, and collected by top antenna
Et,2: transmitted microwave from bottom antenna
Er,2: reflected microwave from the lower surface of the sheet, and collected by bottom antenna
VLO: voltage of the local oscillator
VRF: voltage of the RF signal from reflected wave
VIF: voltage of the intermediate signal from down-conversion
V0: voltage of the frequency generator
C1, C2, C3: constants which is dependent on the performance of the RF components used in the system
c: speed of light

The invention claimed is:

1. A method for measuring thickness of a material having opposing sides, comprising:
performing distance measurement to the opposing sides of the material using two radar transceivers having a fixed distance between each other and mounted to be located on opposing sides of the material for thickness measurement,
wherein performing distance measurement from each transceiver includes determining a coarse measurement with a swept millimeter wavelength pulse and refining the coarse measurement by phase comparison between a transmitted radar pulse and a corresponding received radar pulse;
subtracting the distance measurements to the opposing sides of the material from their respective transceiver from the fixed distance between the two radar transceivers; and
measuring velocity of the material by locating a third radar transceiver at a second fixed distance from one transceiver of the two radar transceivers and aligned to transmit and receive radar pulses to and from a same portion of the material as the one transceiver during movement of the material, and cross-correlating radar pulses received by the third radar transceiver and the one transceiver to determine time delay and velocity of material movement,
wherein measuring the velocity further includes generating a surface unevenness signature of the portion as measured by the one transceiver of the two radar transceivers, detecting the surface unevenness signature of the portion as measured by the third radar transceiver, and determining a time difference between the measurement of the portion corresponding to the surface unevenness signature by the one transceiver and the measurement of the portion corresponding to the surface unevenness signature by the third transceiver.

2. The apparatus of claim 1, wherein the material is an elongated flat material of plate, sheet or foil form.

3. The method of claim 2, further comprising continuously measuring the thickness of the material while the material is moving.

4. The method of claim 3, wherein the material is electrically conductive.

5. The method of claim 2, wherein the material is metal in a hot or cold rolling process.

6. The method of claim 1, wherein each of the two radar transceivers has an antenna aimed at the same measurement location on opposing sides of the material being measured.

7. The method of claim 6, wherein each antenna is aimed orthogonally at a surface of the material being measured.

8. The method of claim 6, wherein the fixed distance is determined between the antennas of the two respective radar transceivers.

9. The method of claim 1, wherein the third radar transceiver is located at approximately the same distance from the material as the one transceiver.

10. The method of claim 2, wherein the flat material is paper, plastic, glass, metal, ceramic, composite, laminate, coated or fiber reinforced material in sheet, strip or film.

11. The method of claim 1, wherein determining a coarse measurement includes:
demodulating received pulses to an intermediate frequency (IF) pulse signal;
performing a Fast Fourier Transform (FFT) on data for each IF pulse signal to determine intensity and phase information;
determining a maximum intensity and frequency thereof from the FFT intensity information;
determining a maximum phase from the phase information corresponding to the maximum intensity;
determining intensity and phase demodulators using the frequency of the maximum intensity and the maximum phase;
providing separate intensity and phase demodulated signals by demodulating the corresponding IF pulse signal separately with the determined intensity and phase demodulators;
low-pass filtering the separate demodulated intensity and phase demodulated signals to determine respective intensity and phase values; and
calculating a quadrature phase value from the respective intensity and phase values; and
using the calculated quadrature phase value to determine a coarse measurement.

12. The method of claim 11, wherein refining the coarse measurement uses the FFT phase information.

13. A method of measuring velocity of moving material, comprising:
locating first and second radar transceivers to transmit and receive radar pulses off a same portion of moving flat material at a fixed distance in the direction of flat material movement and cross-correlating received radar pulses by the first and second transceivers to determine time delay and velocity of material movement,
  wherein measuring the velocity further includes generating a surface unevenness signature of the portion as measured by the first radar transceiver, detecting the surface unevenness signature of the portion as measured by the second radar transceiver, and determining a time difference between the measurement of the portion corresponding to the surface unevenness signature by the first radar transceiver and the measurement of the portion corresponding to the surface unevenness signature by the second radar transceiver.

14. The method of claim 13, wherein the first and second radar transceivers are located at approximately the same distance from the moving material.

15. An apparatus for measuring thickness of a material, comprising:
  a pair of radar transceivers mounted at a fixed distance from each other and each adapted to transmit and receive swept radar pulses to and from opposing material surfaces located between the two transceivers,
  wherein each transceiver includes means for demodulating and storing received radar pulses;
  processing means for each transceiver adapted to determine a coarse measurement of distance between the respective transceiver and material surface and adapted for refining the determined coarse measurement of distance; and
  processing means adapted to subtract both refined coarse measurements from the fixed distance to determine thickness of the material;
  a third radar transceiver mounted at a second fixed distance from one transceiver of the pair of radar transceivers and aligned to transmit and receive radar pulses to and from a same portion of the material as the one transceiver during movement of the material; and
  processing means adapted to cross-correlate radar pulses received by the third radar transceiver and the one transceiver to determine time delay and velocity of the moving material;
  wherein determining the time delay and velocity further includes generating a surface unevenness signature of the portion as measured by at least one of the pair of radar transceivers, detecting the surface unevenness signature of the portion as measured by the third radar transceiver, and determining the time delay between the measurement of the portion corresponding to the surface unevenness signature by the one transceiver and the measurement of the portion corresponding to the surface unevenness signature by the third transceiver.

16. The apparatus of claim 15, wherein the material is an elongated flat material of plate, sheet or foil form.

17. The apparatus of claim 15, wherein the pair of radar transceivers and their respective processing means are adapted for continuously measuring the thickness of the material while the material is moving.

18. The apparatus of claim 17, wherein the apparatus is adapted for thickness measurement in a hot or cold metal rolling process.

19. The apparatus of claim 15, wherein each transceiver has an antenna aimed orthogonally at the same measuring point on opposing sides of the material.

20. An apparatus for measuring velocity of moving material, comprising first and second radar transceivers located to transmit and receive radar pulses off a same portion of moving material at a fixed distance from each other in the direction of material movement and processing means for cross-correlating received radar pulses by the first and second transceivers to determine time delay and velocity of material movement,
  wherein determining the time delay and velocity further includes generating a surface unevenness signature of the portion as measured by at least one of the pair of radar transceivers, detecting the surface unevenness signature of the portion as measured by the third radar transceiver, and determining the time delay between the measurement of the portion corresponding to the surface unevenness signature by the one transceiver and the measurement of the portion corresponding to the surface unevenness signature by the third transceiver.

21. The method of claim 20, wherein the first and second radar transceivers are located at approximately the same distance from the moving material.

22. A method for measuring thickness of a material having opposing sides, the method comprising:
  performing a first distance measurement to a first side of the material from a first radar transceiver using the first radar transceiver directed to the first side of the material;
  wherein the first distance measurement comprises determining a first coarse measurement with a swept millimeter wavelength pulse and refining the first coarse measurement by phase comparison between a radar pulse transmitted by the first radar transceiver and a corresponding radar pulse received by the first radar transceiver;
  performing a second distance measurement to a second side of the material from a second radar transceiver using the second radar transceiver mounted a fixed distance from the first transceiver opposite the first transceiver and directed to the second side of the material;
  wherein the second distance measurement comprises determining a second coarse measurement with a swept millimeter wavelength pulse and refining the second coarse measurement by phase comparison between a radar pulse transmitted the second radar transceiver and a corresponding radar pulse received by the second radar transceiver;
  subtracting the first distance measurement and the second distance measurement from the fixed distance between the radar transceivers.

23. The method of claim 22,
  wherein determining the first coarse measurement comprises:
    demodulating received pulses to an intermediate frequency (IF) pulse signal;
    performing a Fast Fourier Transform (FFT) on data for each IF pulse signal to determine intensity and phase information;
    determining a maximum intensity and frequency thereof from the FFT intensity information;
    determining a maximum phase from the phase information corresponding to the maximum intensity;
    determining intensity and phase demodulators using the frequency of the maximum intensity and the maximum phase;
    providing separate intensity and phase demodulated signals by demodulating the corresponding IF pulse signal separately with the determined intensity and phase demodulators;

low-pass filtering the separate demodulated intensity and phase demodulated signals to determine respective intensity and phase values; and calculating a quadrature phase value from the respective intensity and phase values; and using the calculated quadrature phase value to determine a coarse measurement.

* * * * *